United States Patent
Basu et al.

(10) Patent No.: US 10,026,422 B1
(45) Date of Patent: Jul. 17, 2018

(54) WRITE POLE WITH LOW WALL ANGLE

(71) Applicant: Seagate Technology LLC, Cupertino, CA (US)

(72) Inventors: Swaraj Basu, Londonderry (GB); Deirdre Merron, Eglinton (GB); Mark Anthony Gubbins, Letterkenny (IE); Marcus Weigand, Londonderry (GB); Prim Gangmei, Londonderry (GB); Shengzhou Liao, Londonderry (GB); Sharon May McClean, Letterkenny (IE)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/609,719

(22) Filed: May 31, 2017

Related U.S. Application Data

(60) Provisional application No. 62/343,337, filed on May 31, 2016.

(51) Int. Cl.
  *G11B 5/127* (2006.01)
  *G11B 5/31* (2006.01)

(52) U.S. Cl.
  CPC .......... *G11B 5/3116* (2013.01); *G11B 5/1278* (2013.01); *G11B 5/315* (2013.01)

(58) Field of Classification Search
  CPC ...... G11B 5/1278; G11B 5/3116; G11B 5/315
  USPC .............. 360/125.09, 125.1, 125.11, 125.13, 360/125.14, 125.15
  See application file for complete search history.

(56) References Cited

U.S. PATENT DOCUMENTS

| | | | |
|---|---|---|---|
| 7,417,824 B2 | 8/2008 | Kameda | |
| 8,018,679 B2 | 9/2011 | Hsiao et al. | |
| 8,031,433 B2 | 10/2011 | Yan et al. | |
| 8,085,498 B2 | 12/2011 | Bai et al. | |
| 8,576,514 B2 | 11/2013 | Sasaki et al. | |
| 8,619,509 B1 | 12/2013 | Rivkin et al. | |
| 8,767,347 B1 * | 7/2014 | Sasaki | G11B 5/315 360/123.06 |
| 8,797,686 B1 * | 8/2014 | Bai | G11B 5/1278 360/119.03 |
| 8,804,282 B1 * | 8/2014 | Sugiyama | G11B 5/1278 360/125.12 |
| 8,829,649 B2 * | 9/2014 | Kawahara | H01L 23/5228 257/379 |
| 8,937,852 B2 | 1/2015 | Rivkin et al. | |
| 9,082,423 B1 | 7/2015 | Liu et al. | |
| 9,336,798 B1 * | 5/2016 | Sasaki | G11B 5/315 |
| 9,343,086 B1 * | 5/2016 | Liu | G11B 5/1278 |
| 9,361,912 B1 * | 6/2016 | Liu | G11B 5/187 |
| 9,406,317 B1 * | 8/2016 | Tang | G11B 5/3116 |
| 9,478,236 B1 * | 10/2016 | Liu | G11B 5/147 |

(Continued)

*Primary Examiner* — Jefferson Evans
(74) *Attorney, Agent, or Firm* — Hall Estill Attorneys at Law

(57) ABSTRACT

A data writer may be configured with a write pole that has one or more sidewalls continuously extending from an air bearing surface. A write pole sidewall can have a plurality of different wall angles. A portion of a write pole sidewall contacting the air bearing surface can have a first wall angle with respect to a trailing edge of the write pole, parallel to the air bearing surface. A second portion of the write pole sidewall can be half or less of the first wall angle. A third portion of the write pole sidewall can be smaller than the second wall angle.

20 Claims, 3 Drawing Sheets

(56) References Cited

U.S. PATENT DOCUMENTS

| | | | |
|---|---|---|---|
| 9,741,370 B2 * | 8/2017 | Sasaki | G11B 5/3116 |
| 9,792,929 B1 * | 10/2017 | Sasaki | G11B 5/3123 |
| 2009/0268344 A1 * | 10/2009 | Guan | G11B 5/1278 |
| | | | 360/119.02 |
| 2011/0051293 A1 * | 3/2011 | Bai | G11B 5/1278 |
| | | | 360/313 |
| 2013/0038966 A1 * | 2/2013 | Sasaki | G11B 5/17 |
| | | | 360/123.04 |
| 2015/0103439 A1 * | 4/2015 | Yin | G11B 5/1871 |
| | | | 360/122 |
| 2016/0055869 A1 * | 2/2016 | Sasaki | G11B 5/1272 |
| | | | 360/319 |

* cited by examiner

WRITE POLE WITH LOW WALL ANGLE

RELATED APPLICATION

The present application makes a claim of domestic priority under 35 U.S.C. § 119(e) to U.S. Provisional Application No. 62/343,337 filed May 31, 2016, the contents of which are incorporated by reference.

SUMMARY

A write pole of a data writer, in some embodiments, has a sidewall extending from an air bearing surface and oriented with at least first, second, and third wall angles that are each measured with respect to a trailing edge of the write pole, parallel to the air bearing surface. The second wall angle can be half or less of the first wall angle and the third wall angle may be less than the second wall angle.

DETAILED DESCRIPTION

Various embodiments of the present disclosure are generally directed to a data writer write pole with a sidewall shaped to have multiple different low wall angles with respect to a plane parallel to an air bearing surface.

In data storage systems employing rotating media, the writeability and data bit areal density capability of a data writers is emphasized. To that end, side shields can be progressively brought closer to the write pole of the data writer to increase the track per inch capability of the data writer. However, writeability of the data writer can be compromised by moving side shields closer to the write pole due to leakage of magnetic flux from the write pole to the shield. Hence, there is a continued goal of configuring a data writer with increased writeability and data bit areal density.

Figure 1:
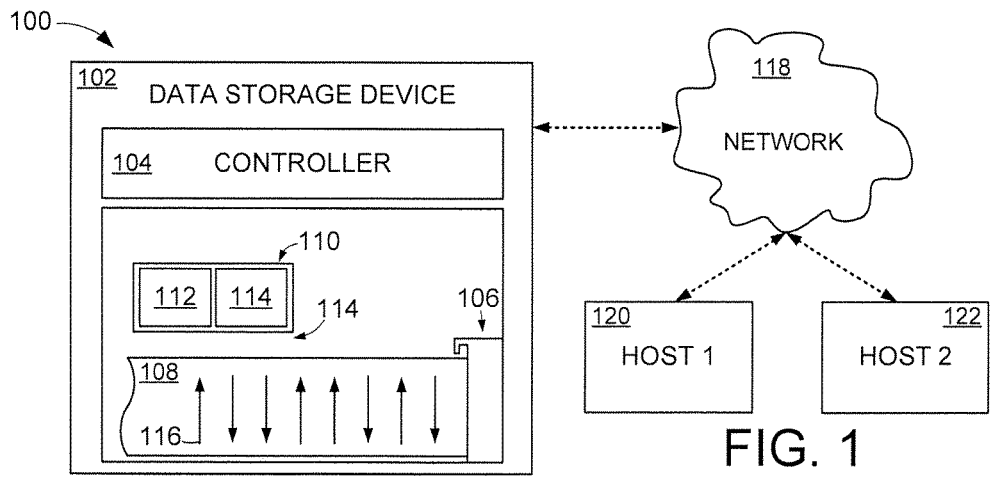
FIG. 1 is a block representation of an example data storage system arranged in accordance with various embodiments.

FIG. 1 is a block representation of an example data storage system 100 that consists of at least one local data storage device 102 in accordance with assorted embodiments. The storage device 102 can have a local controller 104 that directs operation of a spindle 106 to rotate at least one magnetic media 108 while positioning a transducing head 110 proximal to the magnetic media 108 to conduct data bit reading and writing operations. Each transducing head 110 in the data storage device 102 can have one or more data readers 112 and writers 114 that can operate independently and concurrently to store data as magnetic data bits 116 in the media 108.

Although the data storage device 102 can operate autonomously and independently, various embodiments supplement the capabilities of the data storage device 102 via a wired and/or wireless network 118 to at least one host 120. For example, a first host 120 may provide additional caching capabilities while a second host 122 provides additional processing capabilities to the local controller 104. The ability to selectively utilize remote hosts 120 and 122 allows the data storage system 100 to be optimized for a diverse variety of data storage operations and environments.

Figure 2A:
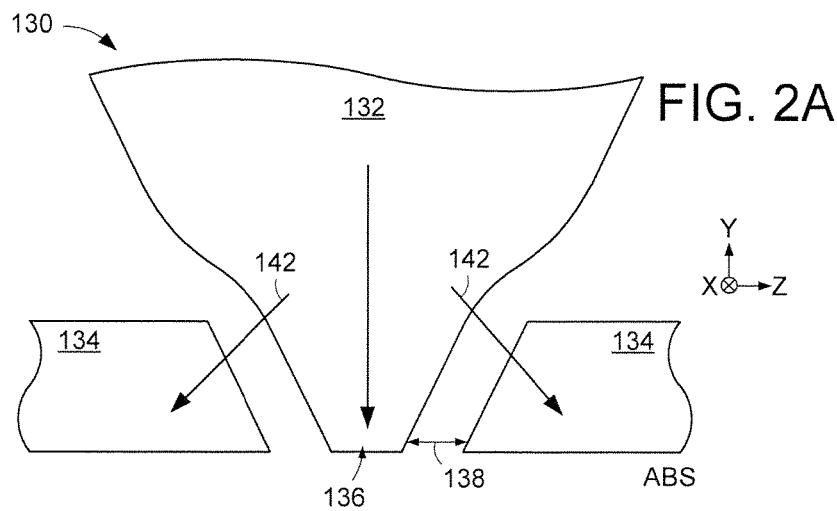
FIGS. 2A and 2B respectively show different views portions of an example data writer capable of being used in the data storage system of FIG. 1.
Figure 2B:
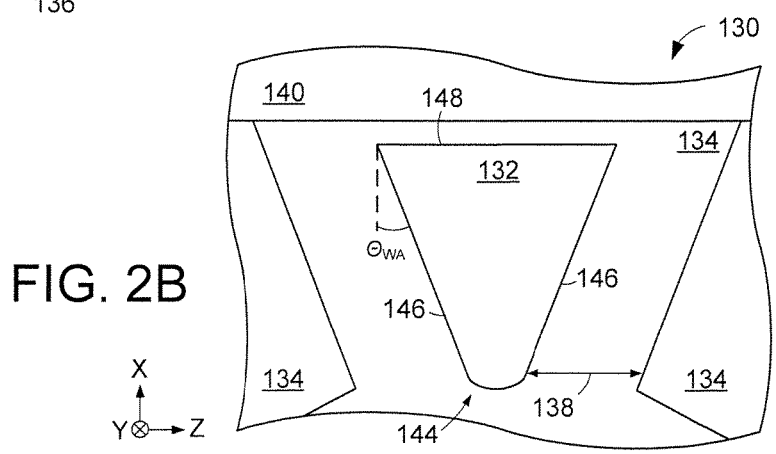

FIGS. 2A and 2B respectively display top and air bearing surface (ABS) view line representations of portions of an example data writer 130 that may be employed in the data storage system 100 of FIG. 1. The top view of FIG. 2A shows a write pole 132 disposed between, and separated from, side shields 134. It is noted that the side shields 134 may act as a flux pathway that can be characterized as a return pole in some embodiments.

Each side shield 134 and a tip region 136 of the write pole 132 contact the ABS and are configured to direct magnetic flux to a particular region of an adjacent data storage medium. The non-magnetic gap distance 138 between each side shield 134 and the write pole 132 can be reduced to increase the ability of the data writer 130 to write data to small data tracks. FIG. 2B shows an ABS view of the write pole 132 that conveys how a trailing edge shield 140 can act in concert with the side shields 134 to define the magnetic extent of the flux emitted from the write pole 132 on the ABS.

However, reducing the amount of non-magnetic material between the write pole 132 and shields 134 and 140 can result in a loss in magnetic writing field strength, and potentially losses in write field gradient, due to magnetic flux leaking from the write pole 132 to the shields, as shown by arrow 142. Such leakage degrades the on-track recording density and data bit areal density capabilities of the data write 130. It is contemplated that flux leakage can be attributed, at least in part, to the shape of the write pole 132 distal to the ABS. That is, the shape of the write pole 132 towards the ABS can be tuned to increase, or decrease, the risk of magnetic flux inadvertently leaking to the shields 134 and 140.

As shown in FIG. 2B, the write pole 132 has matching sidewalls 144 that connect a leading tip 146 with a trailing edge 148. The angle of the respective sidewalls 144 with respect to the trailing edge 148, in the X-Z plane, can be characterized as the wall angle ($\Theta_{WA}$) of the write pole 132. The wall angle can be tuned, in some embodiments, to vary along the Y axis, which can be described as distance from the ABS, to mitigate unwanted magnetic flux movement to the side shields 134.

Figure 3:
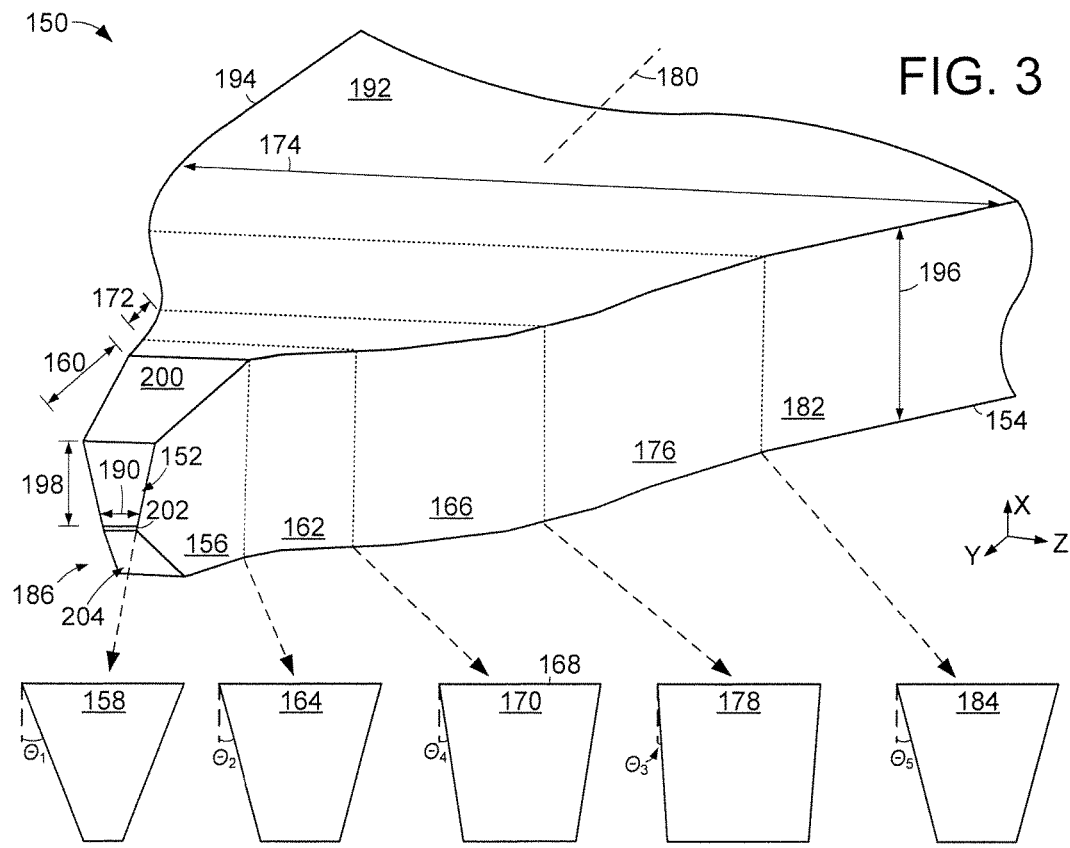
FIG. 3 illustrates a perspective view line representation of a portion of an example write pole capable of being employed in the data storage system of FIG. 1.

FIG. 3 illustrates a line representation of a portion of an example write pole 150 arranged in accordance with some embodiments to provide a balance between data bit areal density and flux leakage risk. The write pole 150 contacts the ABS with a tip surface 152 and continuously extends away from the ABS, along the Y axis, with a sidewall 154 that has a plurality of different wall angles ($\Theta_1$, $\Theta_2$, $\Theta_3$, $\Theta_4$, and $\Theta_5$) with respect to the X-Z plane, parallel to the ABS. It is noted that the angular orientations of $\Theta_1$, $\Theta_2$, $\Theta_3$, $\Theta_4$, and $\Theta_5$ are not drawn necessarily to scale, but represent a non-limiting embodiment. It is further noted that the differently angled portions of the sidewall 154 can respectively be characterized as different sidewalls themselves.

While the write pole sidewall 154 may extend from the ABS at an orthogonal orientation to the ABS, such configuration can inhibit optimal write field strength and gradient of a data writer. Accordingly, a first sidewall section 156 can be angled at a predetermined orientation, such as 10-15° in the X-Z plane, parallel to the ABS, as shown by write pole region 158. The tuned wall angle of the first sidewall section 156 can allow ample magnetic flux to pass from the tip surface 152 to write data. The length 160 of the first sidewall section 156, as measured perpendicular to the ABS, can be tuned to increase data writing performance.

At some length 160 from the ABS, the sidewall 154 transitions to a second sidewall section 162 oriented at a second angle $\Theta_2$ that is less than 10° in the X-Z plane, parallel to the ABS, as shown by write pole region 164. In some embodiments, the angle $\Theta_2$ of the second sidewall section 162 is half or less of the angle of the first sidewall section 156. The relatively low angle $\Theta_2$ of the second sidewall section 160 increases the amount of write pole material behind the ABS while keeping the first sidewall section at an optimize angle above 10°.

A third sidewall section 166 continues from the second sidewall section 162 at an angle $\Theta_3$ that is less than the angle $\Theta_2$ of the second sidewall section 162 relative to the ABS. Hence, the wall angle $\Theta_3$ of the third sidewall section 166 is nearly perpendicular to the trailing edge 168 of the write pole in the X-Z plane, parallel to the ABS. The low wall angle of the third sidewall section 166 compared to sections 156, 162, and 166, as shown by write pole region 170, provides sufficient write pole material to ensure high write field amplitude and gradient without increasing write curvature compared to a write pole having sidewall angles that are within a 5° range.

While the third sidewall section 166 may continue for any length 172 and have a varying width 174, as measured parallel to the ABS, some embodiments transition the sidewall 154 to a fourth sidewall section 176 that forms a fourth wall angle $\Theta_4$ in the X-Z plane, parallel with the ABS, as shown by write pole region 178. The fourth angle $\Theta_4$ can be tuned in combination with the other sidewall angles $\Theta_1$, $\Theta_2$, $\Theta_3$, and $\Theta_5$ to provide a customized amount of write field, write field gradient, and write field curvature to the tip surface 152. As a non-limiting example, the third angle $\theta_4$ matches the second angle $\Theta_2$ to be less than the first angle $\Theta_1$ and more than the third angle $\theta_3$, but such configuration can be adjusted so that the fourth angle $\Theta_4$ is different than the angle ($\theta_1$, $\Theta_2$, $\Theta_3$, and $\Theta_5$) of any other sidewall portion.

The size of the fourth sidewall portion 176 can correspond with a relatively large write pole width 174 away from the ABS, as measured between opposite write pole sidewalls, compared to steep write pole sidewalls that never form less than an approximately 10° with respect to the ABS. As such, the write pole width 174 can be tailored to be vary along a direction parallel to a longitudinal axis 180 of the write pole 150 to control data writer output and performance. For instance, at some distance from the ABS, the write pole width 174 can correspond to the orientation $\Theta_5$ of a fifth sidewall portion 182, as shown by write pole region 184, which may be less than the first angle $\Theta_2$ and greater than the second $\Theta_2$, third $\Theta_3$, and fourth $\Theta_4$ sidewall angles.

It is noted that the number, size, and transition shape of the various sidewall portions can be tuned to optimize write field performance of the write pole 150 without increasing the risk of unwanted flux leakage to adjacent shields. That is, the assorted sidewall portions can be different, or matching, lengths and widths as well as have different linear or curvilinear shapes and transitions between portions to control magnetic flux delivery to the tip surface 152. The tuning of the respective sidewall portions does not increase the risk of flux leakage because the first sidewall angle $\Theta_1$, which is the closest sidewall to the side shields, has a relatively steep orientation that has a low risk and incidence of flux leakage.

It is noted that the write pole tip 186 has a varying width 190 that reduces from the varying widths 174 of the pole body 192. It is noted that the varying write pole width 174 is measured between write pole sidewalls 154 and 194, parallel to the ABS along the Z axis. The pole tip 186, as shown, has multiple tip surfaces that taper to the ABS surface 152. Although any number, size, and shape surface can be used to reduce the body thickness 196 and body width 174 to a tip thickness 198 and the tip width 190, the pole tip 186 comprises at least the tip surface 152, second surface 200, third surface 202, and fourth surface 204. The respective surfaces of the tip 186 are oriented at different angles with respect to the ABS to balance write field amplitude and gradient without increasing the risk of flux leakage to shields on the ABS, such as shields 134 and 140.

The pole body 192 is defined by the plurality of linear and/or curvilinear sections 156, 162, 166, 176, and 182, which are individually denoted by segmented lines that each maintain a trapezoidal cross-sectional shape, as shown in regions 158, 164, 170, 178, and 184. The number, shape, and size of the respective sections may result in one or more sections being oriented with matching angles with respect to the ABS, matching lengths, matching widths, different angles with respect to the ABS, different lengths, and/or different widths. In some embodiments, one or more proximal sections can be configured with an average angle orientation with respect to the ABS. In other words, the mean of several contiguous sections can represent a sidewall section angle without each constituent section being exactly equal to the mean angle.

Various non-limiting embodiments employ the assorted sidewall sections to provide at least 5 different wall angles each measured with respect to the X-Y plane, perpendicular to the ABS. For example, section 156 of the pole tip 186 can contact the ABS with a 14.5° wall angle while section 162 reduces the wall angle to 5° and then to 2° in section 166 before increasing the wall angle back to 5° in section 176. A 10° wall angle may be employed in section 182 and may continue for any distance, such as to a back pole or yoke portion of a data writer. The 10° orientation of section 182 can allow for optimized data flux transition from a writer coil to provide for high write field amplitude at the ABS surface 152.

It is noted that the assorted angles of the write pole body 192 are not limiting or required. For clarity, a tuned write pole 150 may employ five or more different wall angles each measured from an X-Y plane extending perpendicular to the ABS and five or more different sidewall angles each measured in the X-Z plane. The combination of different wall angles and sidewall angles customizes the delivery of magnetic flux to optimize write pole performance while mitigating the risk of flux leakage away from the write pole 150.

Figure 4:
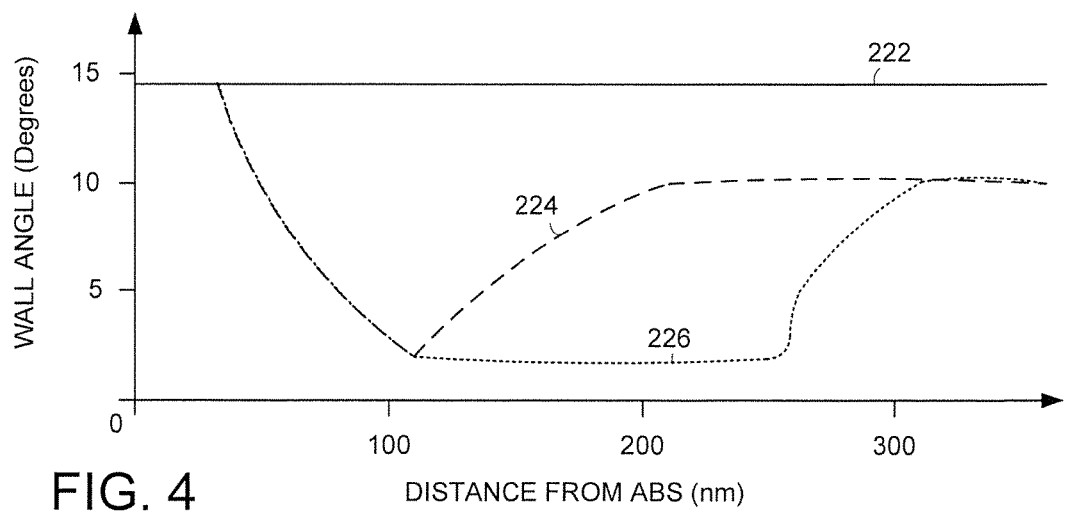
FIG. 4 plots structural data corresponding to an example write pole constructed and operated in accordance with various embodiments.

FIG. 4 plots a structural data associated with different write pole configurations that can individually, or collectively, be employed in a data storage device in accordance with some embodiments. Each write pole configuration compares distance from the ABS to wall angle (WA) with respect to the ABS. Solid line 222 represents a baseline pole sidewall that continuously extends from the ABS with an approximately 14.5° angle beyond 300 nm from the ABS.

Segmented lines 224 and 226 represent different configurations that each begin with a 14.5° sidewall angle that abruptly changes to a less than 5° wall angle with 100 nm from the ABS. The configuration of line 224 gradually increases the wall angle to approximately 10° by 200 nm from the ABS while the configuration of line 226 maintains an approximately 2° wall angle until roughly 250 nm, as shown, before increasing to 10° at approximately 300 nm from the ABS. The different pole sidewall configurations illustrate how the wall angle can be tuned to provide more, or less, magnetic pole material that customizes the supply and delivery of magnetic flux to the ABS.

It can be appreciated that the low wall angles of the configurations of lines 224 and 226 can provide around a 17% increase in pole body surface area compared to the baseline configuration 222. It is contemplated that the increased amount of material in the write pole body can result in approximately a 50% increase in performance metrics, such as maximum write field, write field gradient, write field angle, and curvature. Such performance increases are logically connected to the tuned pole body sidewall that allows more magnetic flux to be positioned close to the ABS surface without being so close that inadvertent shunting occurs with adjacent shields.

In some embodiments, a write pole is configured with obtuse wall angles while other embodiments can arrange the write pole as an inverse trapezoid with the trailing edge 168 being shorter than the leading tip edge, as measured along the Z axis, parallel to the ABS. With the ability to customize the size of the wall angle depending on the distance from the ABS complements the ability to invert the trapezoidal shape of the write to optimize a write pole's write field and gradient for particular data writer environments, which can entail shield configurations, data writing density capabilities, and assisted data writing capabilities, such as heat assisted magnetic recording (HAMR).

Figure 5:
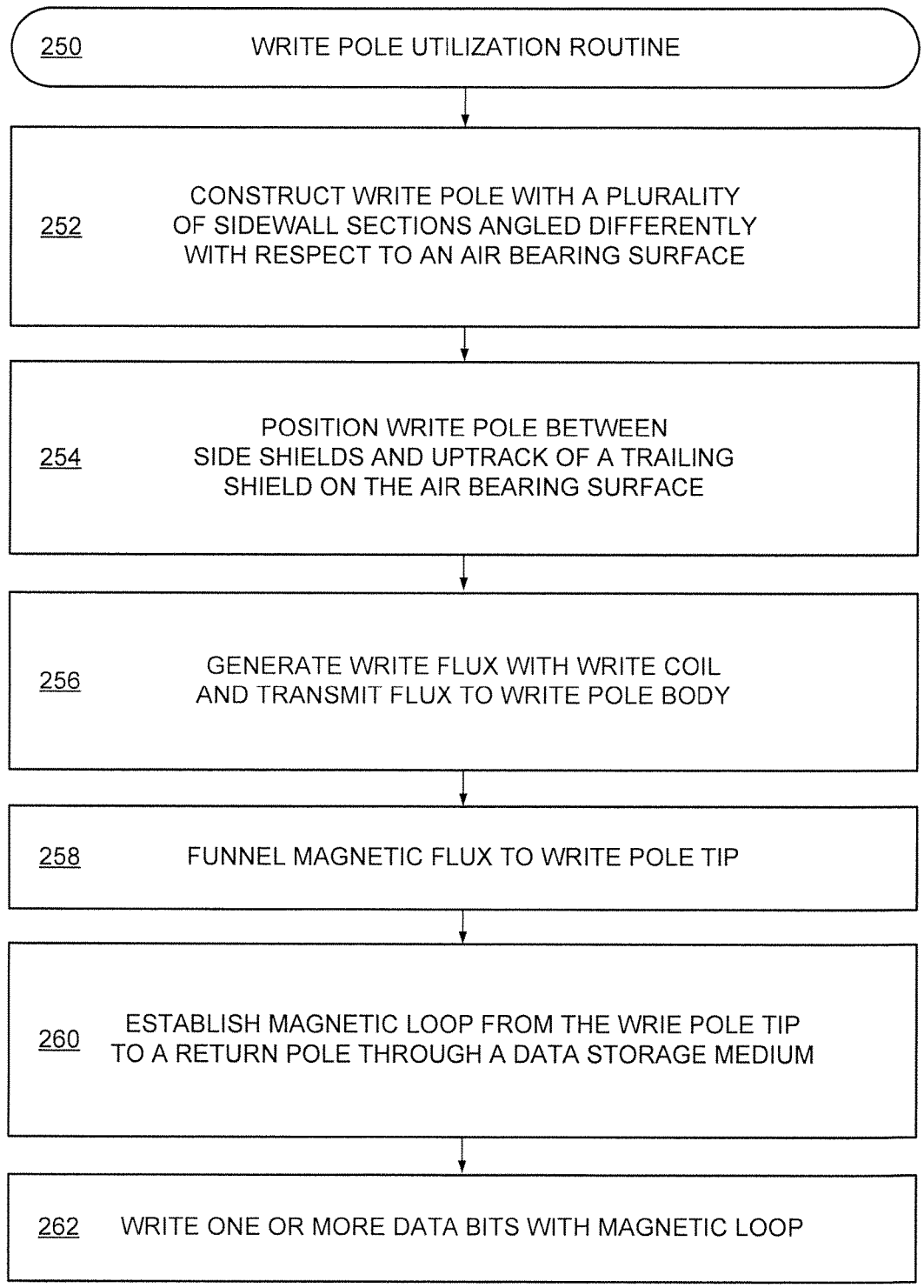
FIG. 5 provides a flowchart for an example write pole fabrication routine performed in accordance with various embodiments.

FIG. 5 is a flowchart of an example write pole utilization routine 250 that can be carried out by a data storage device in accordance with some embodiments. The routine 250 initially constructs a write pole in step 252 with a plurality of sidewall sections that are angled differently with respect to an air bearing surface (ABS). The write pole sidewall sections can be configured with similar, or dissimilar, sizes and shapes to continuously extend from the ABS. It is contemplated that step 252 concurrently, or successively, forms matching sidewalls on opposite sides of the write pole and constructs a write pole tip of multiple different taper surfaces, as shown in FIG. 4.

Construction of the write pole leads to step 254 where the write pole is positioned between side shields and uptrack of a trailing shield on the ABS. The assembly of step 254 may further consist of attaching and/or connecting various portions of a data writer to form a functional data storage device. An assembled data writer has a writer coil that generates magnetic flux in step 256 that is transmitted to a body portion of the write pole. The magnetic flux is funneled to a write pole tip portion of the write pole in step 258 in preparation of forming a data writing magnetic loop in step 260.

The magnetic loop established in step 260 continuously extends from the write pole tip to one or more return poles through an adjacent data storage medium that is positioned opposite an air bearing from the write and return poles. The magnetic loop is maintained, or selectively activated at different times, to write a magnetic polarity to one or more data tracks of the data storage medium in step 262. The tuned construction of the write pole sidewalls in step 252 allows the writing of greater on-track recording density (BPIC) due to higher write field amplitude and gradient at the write pole tip.

By customizing the number, angle, size, and shape of a write pole sidewall, data writing performance can be optimized as a balance of write field data writing capability versus risk of shunting. The use of relatively low write pole wall angles, more write pole material is available to transfer magnetic flux to a write pole tip. Meanwhile, the relatively high write pole tip wall angle provides a reduced risk of inadvertent flux loss via shunting to adjacent magnetic shields and/or poles. Through the optimization of write pole sidewalls with relatively low wall angles, the write pole has an increased width closer to the ABS, which corresponds with greater data writing performance without degrading write characteristics like skew, curvature, amplitude, and gradient.

It is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. An apparatus comprising a write pole extending from an air bearing surface (ABS) with first and second sidewalls segmented into a first region disposed between a second region and a third region, the third region separated from an air bearing surface by at least 100 nm, the first region comprising a first sidewall angle and a first wall angle, the second region contacting the ABS and comprising a second sidewall angle and a second wall angle, the third region comprising a third sidewall angle and a third wall angle, each of the regions defined between the first and second sidewalls, the first, second, and third wall angles each being different as measured from a first plane extending perpendicular to the ABS, the first, second, and third sidewall angles each being different as measured in a second plane oriented parallel to the ABS, the third sidewall angle being smaller than the second sidewall angle and greater than the first sidewall angle.

2. The apparatus of claim 1, wherein each of the at least three regions is continuously linear.

3. The apparatus of claim 1, wherein the wall angle of the first and second sidewalls decrease throughout the at least three regions as a distance from the ABS increases.

4. The apparatus of claim 1, wherein the sidewall angle of the first and second sidewalls decrease throughout the at least three regions as a distance from the ABS increases.

5. The apparatus of claim 1, wherein the wall angle and sidewall angle of each of the at least three regions are different.

6. The apparatus of claim 1, wherein the write pole has an increasing width throughout the at least three regions as a distance from the ABS increases.

7. The apparatus of claim 1, wherein the write pole comprises a tip having a decreasing width and thickness as a distance from the ABS decreases.

8. The apparatus of claim 1, wherein the write pole is disposed between and separated from first and second magnetic shields on the ABS.

9. The apparatus of claim 8, wherein the write pole is separated from a trailing edge magnetic shield on the ABS.

10. An apparatus comprising a write pole having a sidewall continuously extending from an air bearing surface (ABS) with first, second, third, fourth, and fifth regions each comprising a trapezoidal cross-sectional shape and a sidewall section having different wall angles as measured from a plane extending perpendicular to the ABS, the third region separated from the ABS by approximately 100 nm, the first wall angle being between 0-15° throughout the first region, the second wall angle being less than 10° throughout the second region, and the third wall angle being less than 5° throughout the third region.

11. The apparatus of claim 10, wherein the second sidewall section is disposed between and contacts the first and third sidewall sections.

12. The apparatus of claim 10, wherein the first sidewall region contacts the ABS.

13. The apparatus of claim 12, wherein the first sidewall region has a varying thickness as measured parallel to the ABS.

14. The apparatus of claim 13, wherein the second, third, fourth, and fifth regions each have a uniform thickness throughout the respective regions.

15. The apparatus of claim 10, wherein the different wall angles of the first, second, and third regions each correspond with varying write pole widths as measured parallel to the ABS.

16. The apparatus of claim 10, wherein each of the sidewall sections of the first, second, third, fourth, and fifth region have a respective length as measured perpendicular to the ABS, each sidewall sections being continuously linear throughout the respective lengths.

17. The apparatus of claim 10, wherein a fourth wall angle of the fourth region is 5° or greater.

18. The apparatus of claim 10, wherein third region is separated from the ABS by more than 100 nm.

19. A method comprising:
provide a write pole extending from an air bearing surface (ABS) with first and second sidewalls segmented into first, second, and third linear regions, the first linear region disposed between the second and third linear regions, each of the linear regions defined between the first and second sidewalls, the first linear region comprising a first wall angle and a first sidewall angle, the second linear region contacting the ABS and comprising a second wall angle and a second sidewall angle, the third linear region comprising a third wall angle and third sidewall angle, each wall angle being different as measured perpendicular to the ABS, each sidewall angle being different as measured parallel to the ABS, the third sidewall angle being smaller than the second sidewall angle and greater than the first sidewall angle;
pass write flux through each of the at least three linear regions; and
write a magnetic data bit of an adjacent data storage medium with the write flux.

20. The method of claim 19, wherein the different wall angles of the at least three linear regions are configured to mitigate flux leakage from the write pole to an adjacent magnetic shield.

* * * * *